United States Patent [19]

Rotharmel

[11] Patent Number: 5,154,400
[45] Date of Patent: Oct. 13, 1992

[54] LINE-STRETCHING TOOL FOR A LINE STRAINER

[76] Inventor: Jean-Michel Rotharmel, 305 Haddon Cir., Vernon Hills, Ill. 60061

[21] Appl. No.: 465,488

[22] Filed: Jan. 16, 1990

[51] Int. Cl.⁵ .......................... B21F 9/00; B25B 25/00
[52] U.S. Cl. ................................. 254/243; 254/213; 24/71.2
[58] Field of Search .............. 24/68 CD, 71.1, 71.2; 254/213, 214, 243

[56] References Cited

U.S. PATENT DOCUMENTS

| | | | |
|---|---|---|---|
| 528,151 | 10/1894 | Crisp | 254/213 |
| 529,648 | 11/1894 | Green | 24/71.2 |
| 588,213 | 8/1897 | Beekly | 24/71.2 |
| 590,308 | 9/1897 | Frantz | 24/71.2 |
| 592,787 | 11/1897 | Judy et al. | 24/71.3 |
| 595,201 | 12/1897 | Payne | 24/71.2 |
| 620,529 | 2/1894 | Andre | 24/71.2 |
| 621,081 | 3/1899 | Hensley | 24/71.2 |
| 624,524 | 5/1899 | Olinger | 24/71.2 |
| 632,613 | 9/1899 | Wyatt | 24/71.2 |
| 642,462 | 1/1900 | Kimmel | 24/71.3 |
| 669,506 | 3/1901 | Clark | 24/71.2 |
| 671,955 | 4/1901 | Gunn | 24/71.2 |
| 915,686 | 3/1909 | Locke | 24/71.3 |
| 923,960 | 6/1909 | English | 24/71.3 |
| 1,410,523 | 3/1922 | Allen | 24/71.2 |
| 2,304,139 | 12/1942 | Benbow | 24/71.3 |
| 2,311,792 | 2/1943 | Van Valkenburgh | 24/71.3 |
| 2,597,210 | 5/1952 | Walters | 24/71.3 |
| 3,811,655 | 5/1974 | Foster | 24/71.2 |
| 3,815,180 | 6/1974 | De Haai | 24/71.2 |

Primary Examiner—Daniel P. Stodola
Assistant Examiner—C. Riggs

[57] ABSTRACT

A tool for winding and unwinding for a line-strainer, which has a housing to enclose and secure the strainer during winding and unwinding and provides a mechanism for applying an approximately directed transverse load to the line, such as wire, during the winding or unwinding modes to direct the wire onto or off the strainer hub.

31 Claims, 2 Drawing Sheets

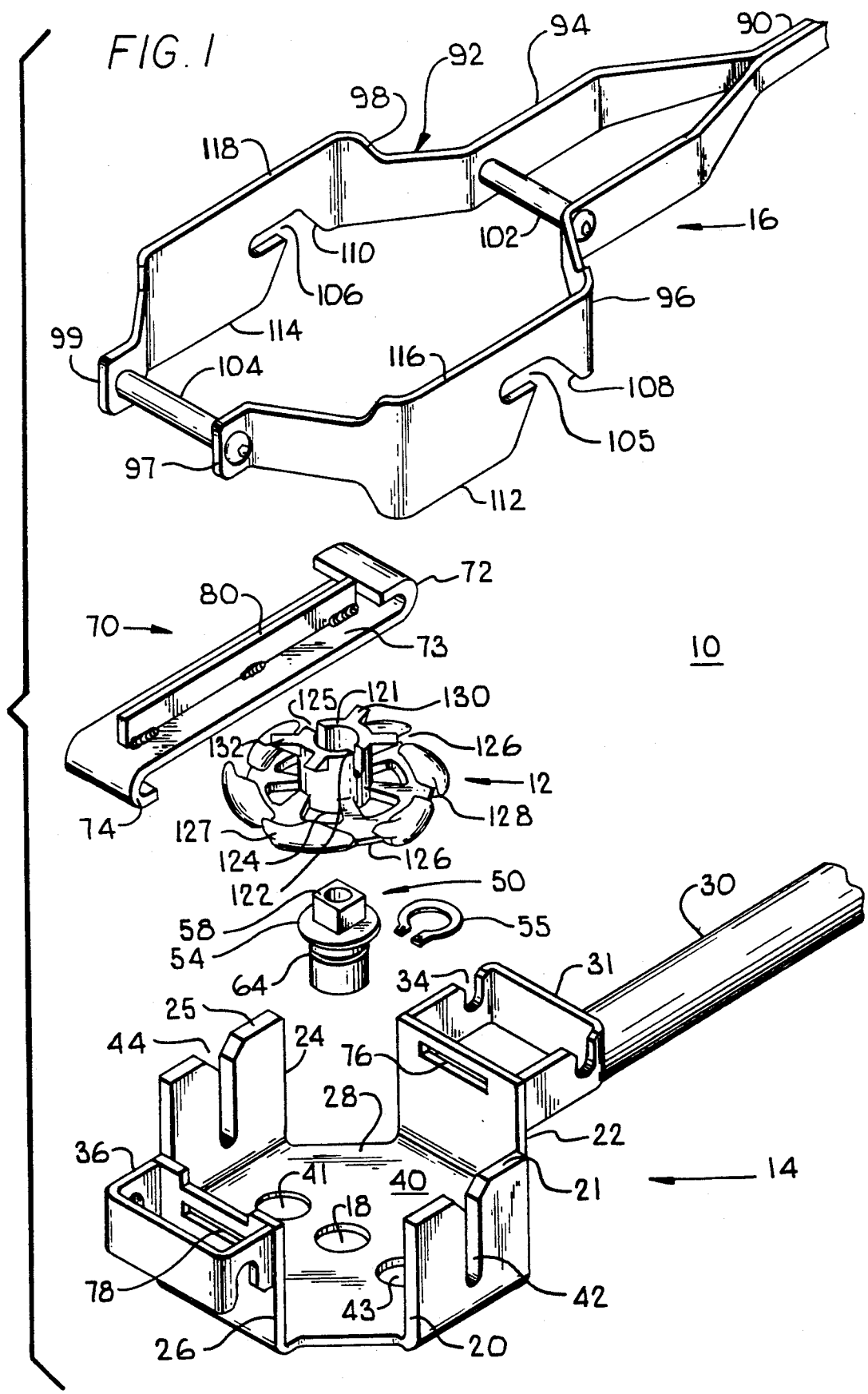

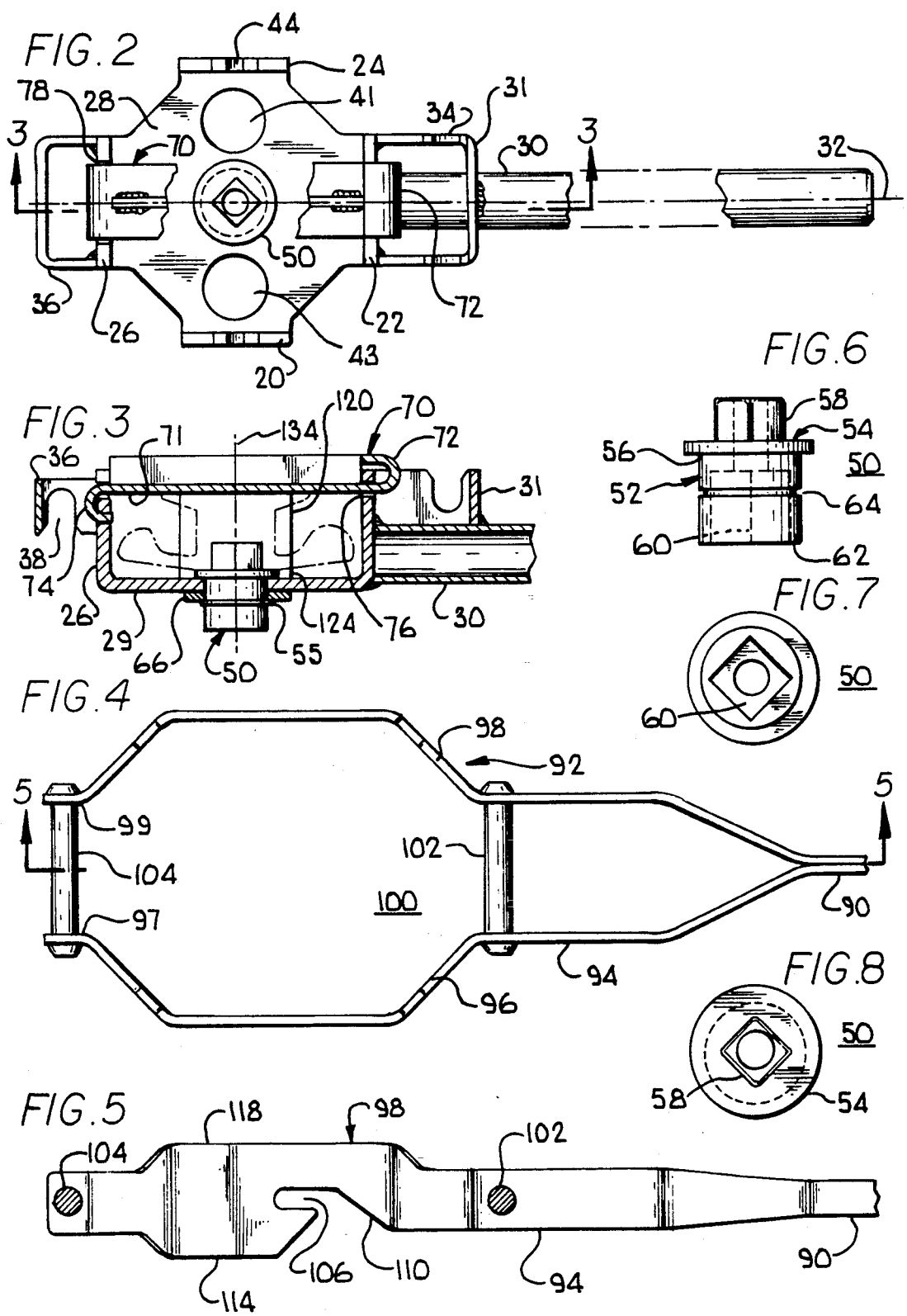

LINE-STRETCHING TOOL FOR A LINE STRAINER

BACKGROUND OF THE INVENTION

The present invention relates to a line straining structure and more particularly to a tool for a line straining apparatus.

Straining apparatus or line-strainers have been utilized to stretch wire lines of various materials, such as wire or cord, for a considerable time, and these earlier straining devices are exemplified by the structure taught and disclosed in U.S. Pat. No. 1,410,523 to Allen. The Allen-'523 strainer is a one-piece structure with a hub and a disc affixed thereon, which hub has a transverse slot at one end and a socket head at the other to receive a socket wrench or other driving means. The disc includes a plurality of peripheral notches extending toward the slotted end. Similar wire tighteners or tensioners are provided in U.S. Pat. No. 2,304,139 to Benbow and U.S. Pat. No. 923,960 to English, which utilize a single-piece structure and wrap the line around a central hub.

The above-noted straining apparatus are driven or turned or rotated by a spike, screw or socket wrench. Driving means for line strainers are shown in U.S. Pat. No. 915,688 to Locke; U.S. Pat. No. 671,955 to Gunn; and, U.S. Pat. No. 592,787 to Judy et.al., Which essentially utilize a wrench or other engaging means to rotate the strainer without otherwise securing the strainer. Alternatively, wrench-like, open-faced fasteners are illustrated in U.S. Pat. Nos. 3,815,180 to De Haai; U.S. Pat. No. 2,597,210 to Walters; U.S. Pat. No. 2,311,792 to Valkenburgh; and, U.S. Pat. No. 642,642 to Kimmel. However, some tightening or straining devices do provide a tightening mechanism that is spatially anchored to a handle or frame as shown in U.S. Pat. Nos. 632,613 to Wyatt; and, U.S. Pat. No. 595,201 to Payne, but these devices particularly relate to braces for tightening furniture, and the straining devices are permanently retained on the wires.

Line-strainers and their associated tools have been utilized in the agricultural industry, such as grape vineyards. However, there are hazards associated with the strainers and their tools, such as uncontrolled movement of the strainer at line rupture or backlash from the tool at strainer disengagement. It is very desirable from both a safety and an operational viewpoint to provide a strainer tensioning tool which provides ease of operation and maintains a tensile load during line winding and a displacing line load with unwinding from the hub of a straining device. Further, the straining apparatus should be an independent entity matable with the tool and easily disengaged after the winding operation. The present invention securely retains the line-strainer even at line rupture and thus minimizes the danger to the operator.

SUMMARY OF THE INVENTION

The present invention provides an apparatus or tool for a line-strainer, which is exemplified by wire or cord strainers. The tool has a line alignment means, and a strainer housing or cage as well as a strainer latch to retain the strainer during either a winding or unwinding operation for operator protection. The strainer tool is operable for both winding and unwinding functions, and is quickly and easily operable with a minimum of training. The dual-function handle structure readily applies tension as a transverse load on the line or wire during either the winding or unwinding operations, which insures displacement of the line from the strainer disc notches at unwinding and maintains the line in a position between the peripheral hub and guide fingers during winding on the strainer hub.

BRIEF DESCRIPTION OF THE DRAWINGS

In the several figures of the Drawings, like reference numerals identify like components, and in the drawings:

FIG. 1 is an exploded view in perspective of the line-stretching tool and straining apparatus;

FIG. 2 is a top plan view of the mounting base and handle with the latching lever;

FIG. 3 is an side view in section taken along 3—3 of FIG. 2 of the mounting base and handle with the straining apparatus:

FIG. 4 is a top plan view of the line lever in FIG.1:

FIG. 5 is a sectional view taken along 5—5 of FIG. 4 of the line lever of FIG. 4;

FIG. 6 is a side elevational view of the capstan in FIG. 1;

FIG. 7 is a bottom plan view of the capstan in FIG. 6; and,

FIG. 8 is a top plan view of the capstan of FIG. 6.

DETAILED DESCRIPTION OF PREFERRED EMBODIMENT

The present invention provides a tool for a line (e.g., cord or wire) straining apparatus. In a preferred embodiment, a cage or housing is provided as a protective enclosure and a base for mounting the line-strainer during either line tightening or loosening operations. The tool is an easily-utilized, portable assembly, which secures the line-strainer to the tool during both winding and unwinding operations, and provides a continuous transverse tensile load to the line during winding or unwinding to give the operator better control of the line and thus the operation. The relatively lightweight and easily portable tool 10 in FIG. 1 is well suited to transport and use by an operator and does not require excess training to demonstrate its use.

Line-straining apparatus 12 and tool 10 with mounting base 14 and lever 16 are shown in an exploded perspective view in FIG. 1. In the preferred embodiment, mounting base 14 has a generally octagonal shape, which is merely exemplary and not a limitation, with a central bore 18 and, four upright arms or sidewalls 20, 22, 24, and 26 approximately normal to base upper face 28 (cf. FIGS. 1 and 2). Arms 20–26 are mounted at alternating sides of octagonal base 14 to provide two pairs of parallel arms 20,24 and 22,26, which upwardly protruding arms 20–26 cooperate with base 14 to provide a generally cuplike structure with a cavity or volume 40. Arms 20 and 24, which are transverse to arms 22, 26 and axis 32, include aligned line-guide slits 42 and 44, respectively, which are open at upper surfaces 21 and 25 of arms 20 and 24.

First bracket 31 with first pivot slot 34 is mounted on arm 22 with first pivot slot 34 transverse to base longitudinal axis 32. First handle 30 is affixed to first bracket 31 and arm 22, and extends along longitudinal axis 32 radially projecting through central bore 18. Second bracket 36 with second pivot slot 38 is mounted on upright arm 26, which is parallel to arm 22, and radially extends from central bore 18 in an opposite direction from handle 30.

In FIGS. 6–8, a rotatable capstan 50 for line-straining apparatus 12 is mounted and rotatably operable in central bore 18 of mounting base 14. Capstan 50 has a generally cylindrically shaped body 52 with annular collar 54 at first or upper end 56, and a square or diamond-shaped lug 58 longitudinally projecting from upper end 56. A recess 60 is formed in second or lower capstan end 62, to receive a driving means such as a ratchet handle (not shown). Although recess 60 is illustrated in FIGS. 6 and 7 as a diamond or square shape, this shape is merely exemplary and not a limitation. Annular indentation 64 in body 52 is utilized as a holding slot for a snap retaining ring 55 for capstan 50. In the illustrated embodiment, body 52 of capstan 50 is inserted through central bore 18 to rest collar 54 on base upper surface 28 in volume 40 and snap ring 55 is positioned in indentation 64 at base outer surface 29 to secure the capstan 50 in bore 18. As shown in FIG. 3 an annular washer 66 may be utilized between snap ring 55 and base 14 to enhance free rotation of capstan 50.

Strainer 12 is mounted and secured on capstan 50 in enclosure 40 by securing latch 70, which is illustrated in FIGS. 1–3 as a generally rectangular plate with an upwardly looped, U-shaped first end 72 and a downwardly looped, U-shaped second end 74. In FIG. 3, upward looped first end 72 is inserted in slot 76 of arm 22, which allows pivotal rotation of latch 70 between an open-cavity position for removal or insertion of strainer 12 and a closed-cavity position, which secures the apparatus 12 in cavity 40 on capstan lug 58. In the closed-cavity position, latch 70 traverses cavity 40 and second loop end 74 slidably engages latch port 78 in upright arm 26 to secure latch 70. The sliding action is provided along axis 32 and is permitted by the free play of the loop in slot 76. Inner face 71 of latch 70 contacts upper surface 121 of strainer hub 120 at the closed cavity position and serves as a bearing surface for strainer 12 during the winding and unwinding operations. Bar 80 is affixed to latch outer face 73 by means such as welding or brazing to strengthen latch 70. Bar 80 contacts loop 72 to close the loop opening and secure loop or first end 72 in slot 76, thus providing a hinge-like structure and securing latch 70 to base 14.

Cooperating lever 16 has a second handle 90 with a fork-like assembly 92 secured at first end 94. Although handle 90 and assembly 92 are shown as separate elements, it is apparent that they could be formed from separate straps and joined to form handle 90. In FIG. 4, assembly 92 has a fork-like outline with first leg 96, second leg 98 and gap 100 therebetween, which gap 100 is wide enough to accept mounting base 14. A first pivot rod 102 extends between first and second legs 96 and 98 in proximity to handle end 94, and a second pivot rod 104 extends between first and second legs 96 and 98 at remote or second leg ends 97 and 99, respectively. Longitudinal slits 105, 106 of legs 96 and 98 have angular paths 108, 110 open at leg lower surfaces 112, 114, respectively, which slits are parallel and aligned. Further, slits 105, 106 are aligned with arm slots 42, 44 when first pivot rod 102 is positioned in first pivot slot 34.

In the preferred embodiment, strainer 12 has a hub 120 with a first and slotted end 122 and a second end 124 with a recess (not shown), which is matable with lug 58 of capstan 50. Disc 128 is secured to hub 120, which are generally a single element, in proximity to second end 124 and has inclined peripheral notches 126 with protruding nails or distal ends 127 extending toward slot 125 in hub first end 122. At least two fingers 130 and 132 radially extend outward from transverse axis 134 of hub 120 at slotted end 122, which fingers operate to maintain the winding line on hub 120. The length of generally cylindrical hub 120 permits latch 70 to close and securely retain strainer 12 between latch 70 and collar 54 on capstan 50 for rotation by the driving means (not shown) inserted in capstan recess 60. In the illustrated embodiment, the peripheral notches 126 are diametrically aligned in pairs with a notch on either side of disc 128.

In a winding mode of operation, strainer 12 is mounted on capstan lug 58 in cavity 40. A line, such as string or wire, is threaded through slots 42 and 44 of upright arms 20 and 24, as well as strainer hub slot 125. Latch 70 is pivoted on upward loop 72 to engage downward loop 74 in slot 78 and secure strainer 12 on capstan 50. Thereafter, lever legs 96 and 98 are positioned about the housing with second rod 104 positioned in second pivot slot 38 to provide either lower surfaces 112 and 114 or upper surfaces 116, 118 contacting the line. The driving means, (e.g., a ratchet device) is inserted into capstan recess 60 to rotate strainer 12 in a clockwise direction as shown in FIGS. 1 and 2. The clockwise rotation of capstan 50 moves disc notches 126 to engage the line for winding about hub 120. Hub fingers 130, 132 provide an upper boundary to limit the travel of the wound line and prevent its migration off hub 120. Further, lever 16 pivots on secured rod 102 in a pulsating motion as the line is wound and grasping of the first and second handles in one hand applies a vertically downward (relative to FIGS. 1 and 3) pressure on the line by the leg lower or upper surfaces contacting the line and thus maintains the line in hub slot 125. The pressure further limits the spiral travel of the line to insure that it does not misfeed and wander from the hub.

In the unwinding mode, strainer 12 will already have a line wound on hub 120 before it is positioned on capstan 50 and again secured in cavity 40 by latch 70. The line extending from either side of hub 120 is threaded in slits 105, 106, however, first pivot rod 102 is mounted in first pivot slot 34. The first and second handles are again squeezed together to apply a vertical load to the line during the unwinding counterclockwise rotation of strainer 12. The vertical tensile load on the line insures that the line extending through the peripheral notches 126 of disc 128 is elevated above the projecting distal ends 127 to avoid line recapture, which permits safe unwinding of the line. The operator can view and assure himself of the line displacement from notches 126 through portals 41 and 43 in lower surface 28. Insuring line displacement from notches 126 is particularly important, as initial relief of the tensile load on the strained wire is frequently noted as an incipient cause of a sudden rupture of the line, as well as a cause of line snarling. Thus, the significance of retention of strainer 12 in cavity 40 can be appreciated, as it protects the tool user from the vagaries of an uncontrolled strainer 12 suddenly released from a tensile load.

While only a specific embodiment of the invention has been described and shown, it is apparent that various alterations and modifications can be made therein. It is, therefore, the intention in the appended claims to cover all such modifications and alterations as may fall within the scope and spirit of the invention.

What is claimed is:

1. A tool for winding and unwinding a line-strainer, which is utilized to wind, tighten and retain a line, said tool comprising:

a housing with a longitudinal axis, which housing has a base with a central port and sidewall means mounted on said base, said sidewall means defining a first slot, a second slot, an upper edge and an outer surface, and cooperating with said base to define an enclosure;

a first bracket with a first pivot slot and a second bracket with a second pivot slot;

means for rotating said line-strainer mountable in said central port;

a lever having a first leg and a second leg, each of said first and second legs with an upper surface, a lower surface, a first end and a second end said first and second legs coupled at said first ends and projecting generally parallel from said coupled first ends to define a gap therebetween;

said first leg having a first notch and said second leg a second notch;

a first pivot rod mounted in proximity to said first ends, and a second pivot rod mounted at said second ends;

said second pivot rod positionable in said second pivot slot to pivot said lever to contact said line with one of said upper and lower surfaces of said lever first and second legs to maintain a transverse load on said line and directed toward said base during line winding, and said first pivot rod positionable in said first pivot slot to pivot said lever with said line positioned in said first and second notches to apply a transverse load on said line away from said base during line unwinding 2. A tool for said line-strainer as claimed in claim 1 wherein said sidewall means first and second slots are aligned at diametrically opposite sidewall positions and open at said sidewall means upper edge.

3. A tool for said line-strainer as claimed in claim 1 wherein said first and second brackets are mounted on said sidewall means outer surface and aligned at diametrically opposite positions along said housing longitudinal axis.

4. A tool for a line-strainer as claimed in claim 3 further comprising a first handle, which is coupled to said first bracket and sidewall outer surface and extends outwardly from said housing along said longitudinal axis.

5. A tool for a line-strainer as claimed in claim 1 further comprising a second handle coupled to said coupled first ends of said lever.

6. A tool for a line-strainer as claimed in claim 1 where said first and second notches in said first and second legs are diametrically aligned.

7. A tool for a line-strainer as claimed in claim 1 wherein said first pivot rod is connected between said first leg and said second leg in proximity to said first ends; and, said second pivot rod is connected between said first leg and said second leg at said second ends.

8. A tool for a line-strainer as claimed in claim 1 wherein said sidewall means is an annular wall on said base.

9. A tool for a line-strainer as claimed in claim 1 wherein said sidewall means is a first pair of opposed upright arms, which first pair of arms are diametrically opposed and aligned along said longitudinal axis, and a second pair of upright arms, which second pair of arms are diametrically opposed on said base and transversely aligned to said longitudinal axis.

10. A tool for a line-strainer as claimed in claim 9 wherein said first bracket is mounted on one of said upright arms of said first pair of upright arms and said second bracket is mounted on the other of said arms of said first pair of upright arms; and said sidewall means first slot is provided in one said upright arms of said second pair of upright arms and said sidewall means second slot is provided in the other upright arm of said second pair of arms.

11. A tool for a line-strainer as claimed in claim 1 wherein said means for rotating is a capstan to receive said strainer, said capstan having a body with an annular collar, an upper end and a lower end, which capstan is positioned in said central port with said annular collar and upper end in said enclosure;

a mounting lug to receive said line-strainer positioned on said upper end, and said body defining a recess at said lower end to receive means for driving said capstan and strainer.

12. A tool for a line-strainer as claimed in claim 11 wherein said strainer has a hub, said hub having a slotted end with a slot extending from said slotted end, a recessed end with a mounting recess extending into said hub, and a generally annular disc at said recessed end with inclined peripheral notches extending toward said slotted end.

13. A tool for a line-strainer as claimed in claim 1 and further comprising means for latching to secure said line strainer in said enclosure during winding and unwinding operations.

14. A tool for a line-strainer as claimed in claim 13 wherein said means for latching is a bar with a longitudinal axis, a top face and a bottom face, a first end having a first formed end cooperating with said top face to define a first hinge loop and a second formed end cooperating with said bottom face to define a second hinge loop;

said sidewall means defining a first hinge slit in proximity to said first bracket and a second hinge slit in proximity to said second bracket, each of said first and second hinge slits operable to receive a hinge loop;

one of said first and second hinge loops positioned in one of said first and second bracket hinge slits and operable to pivot said latch to contact and engage the other of said first and second hinge loops in said other bracket hinge slit to secure said latch bar across said enclosure and retain said strainer therein.

15. A tool for a line-strainer as claimed in claim 14 further comprising a reinforcing member, said reinforcing member mounted on one of said top and bottom latching bar faces to strengthen said latch bar and operable as a handle to said latch bar and secure said hinge loops in said slits.

16. A tool for a line-strainer as claimed in claim 15 wherein said line strainer includes a strainer hub said latch surface opposite said reinforcing member contacts said strainer hub and is operable as a bearing surface.

17. A tool for a line-strainer as claimed in claim 1 wherein said base defines a first through-bore and a second through-bore generally in diametrical alignment with said sidewall means first and second slots to provide viewing ports for said line and line strainer during winding and unwinding.

18. A tool for a line-strainer as claimed in claim 1 wherein said line-strainer has a generally cylindrical hub with a first end with a slot to receive said line, a second end, and means for rotating at said second end, said line-strainer further having a generally annular disc at said second end with inclined peripheral notches extending toward said slotted end.

19. A tool for winding and unwinding a line-strainer, which is utilized to wind, tighten and retain a line, said tool comprising:
- a housing with a longitudinal axis and a first handle, which housing has a base with a central port and sidewall means with an upper edge and an outer surface mounted on said base, said base and sidewall means cooperating to define an enclosure;
- said sidewall means defining a first slot and a second slot, said slots are diametrically aligned and open at said upper edge;
- a first bracket with a first pivot slot and a second bracket with a second pivot slot, said first and second bracket diametrically aligned and mounted on said sidewall means outer surface along said housing longitudinal axis;
- means for rotating said line strainer mountable in said central port;
- a lever having a second handle,
- a first leg with an upper surface, a lower surface, a first end and a second end,
- a second leg having an upper surface, a lower surface, a first end and a second end, which first leg and second leg first ends are coupled to said second handle with said first and second legs generally projecting parallel from said second handle and defining a gap therebetween;
- said first leg defining a first unwinding notch and said second leg defining a second unwinding notch, which first and second unwinding notches are aligned;
- a first pivot rod connected between said first leg and said second leg in proximity to said first end, and
- a second pivot rod connected between said first leg and second leg at said second ends,
- said second pivot rod positionable in said second pivot slot to pivot said lever to contact said line with one of said upper and lower surfaces of said lever first and second legs to maintain a transverse load on said line and directed toward said base during line winding, and said first pivot rod positionable in said first pivot slot to pivot said lever with said line positioned in said first and second unwinding notches to apply a transverse load on said line away from said housing base during line unwinding.

20. A tool for a line-strainer as claimed in claim 19 wherein sidewall means is an annular wall on said base.

21. A tool for a line-strainer as claimed in claim 19 wherein said sidewall means is a first pair of opposed upright arms, which first pair of arms are diametrically opposed and aligned along said longitudinal axis, and a second pair of upright arms, which second pair of arms are diametrically opposed on said base and transversely aligned to said longitudinal axis.

22. A tool for a line-strainer as claimed in claim 21 wherein said first bracket is mounted on one upright arm of said first pair of upright arms and said second bracket is mounted on the other of said upright arms of said first pair of upright arms; and said sidewall first slot is provided in one of said second pair of arms and said sidewall second slot is provided in the other of said second pair of arms.

23. A tool for a line-strainer as claimed in claim 19 wherein said means for rotating is a capstan to receive said strainer, said capstan having a body with an annular collar or upper end and a lower end, which capstan is positioned in said central port with said annular collar and upper end in said enclosure;
- a mounting lug positioned on said upper and said body defining a recess at said lower end to receive means for driving said capstan and strainer.

24. A tool for a line-strainer as claimed in claim 19 and further comprising means for latching, which is operable to secure said line strainer in said enclosure during winding and unwinding operations.

25. A tool for a line-strainer as claimed in claim 24 wherein said strainer has a hub,
- said hub having a slotted end with a slot extending from said slotted end, a recessed end with a mounting recess extending into said hub, and a generally annular disc at said recessed end with inclined peripheral notches extending toward said slotted end 26. A tool for a line-strainer as claimed in claim 24 wherein said means for latching is a bar with a longitudinal axis, a top face and a bottom face, a first end having a first formed end cooperating with said to face to define a first hinge loop and a second formed end cooperating with said bottom face to define a second hinge loop;
- said sidewall means at said first bracket defining a first hinge slit and a second hinge slit at said second bracket, each of said first and second hinge slits operable to receive a hinge loop;
- one of said first and second hinge loops positioned in one of said first and second hinge slits and operable to pivot said latch bar to contact and engage the other of said first and second hinge slits to secure said latch bar across said enclosure and retain said strainer therein.

27. A tool for a line-strainer as claimed in claim 26 further comprising a reinforcing member, said reinforcing member mounted on one of said top and bottom latch bar faces to strengthen said latch bar and to close said hinge loop about said sidewall to secure said latch bar at said slits.

28. A tool for a line-strainer as claimed in claim 27 wherein one of said latch bar top and bottom faces opposite said reinforcing member contacts said strainer hub and is operable as a bearing surface.

29. A tool for a line-strainer as claimed in claim 19 wherein said base defines a first through-bore and a second through-bore generally in diametrical alignment with said sidewall slots to provide viewing ports for said line and line strainer during winding and unwinding.

30. A tool for a line-strainer as claimed in claim 19 wherein said housing has a first handle mounted on one of said sidewall outer surface and said first bracket, which first handle extends from said housing along said housing longitudinal axis.

31. A tool for a line-strainer as claimed in claim 19 wherein said strainer has a hub, which has a slotted end, a second end, a slot extending from said slotted end and means for rotating at said second end, said strainer further having a generally annular disc at said second end with inclined peripheral notches extending toward said slotted end.

* * * * *